US008862475B2

(12) United States Patent
Ativanichayaphong et al.

(10) Patent No.: US 8,862,475 B2
(45) Date of Patent: Oct. 14, 2014

(54) SPEECH-ENABLED CONTENT NAVIGATION AND CONTROL OF A DISTRIBUTED MULTIMODAL BROWSER

(75) Inventors: Soonthorn Ativanichayaphong, Boca Raton, FL (US); Charles W. Cross, Jr., Wellington, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1932 days.

(21) Appl. No.: 11/734,445

(22) Filed: Apr. 12, 2007

(65) Prior Publication Data

US 2008/0255851 A1  Oct. 16, 2008

(51) Int. Cl.

| G10L 21/00 | (2013.01) |
|---|---|
| G10L 25/00 | (2013.01) |
| G06F 15/16 | (2006.01) |
| G06F 3/00 | (2006.01) |
| G06F 3/16 | (2006.01) |
| G10L 15/26 | (2006.01) |

(52) U.S. Cl.
CPC .............. *G10L 15/265* (2013.01); *G06F 3/167* (2013.01); *G10L 15/26* (2013.01); *G06F 3/16* (2013.01)
USPC ........ 704/270.1; 704/270; 704/275; 709/205; 715/700; 715/727; 715/728

(58) Field of Classification Search
CPC ......... G10L 13/00; G10L 15/00; G10L 13/08; G10L 15/22; G10L 15/26; G10L 15/265; G10L 21/00; G10L 21/06; G10L 21/10; G10L 21/16; G10L 25/48; G10L 25/63; G06F 2203/0381; G06F 3/16; G06F 3/167
USPC ........ 704/270, 270.1, 275; 709/205; 715/700, 715/727, 728
See application file for complete search history.

(56) References Cited

U.S. PATENT DOCUMENTS

| 5,577,165 A | 11/1996 | Takebayashi et al. |
| 5,584,052 A | 12/1996 | Gulau et al. |

(Continued)

FOREIGN PATENT DOCUMENTS

| CN | 1385783 | 12/2002 |
| CN | 1385783 A | 12/2002 |

(Continued)

OTHER PUBLICATIONS

Tsangaris, M. M. and Potamianos, A. 2002. Agora: a GUI approach to multimodal user interfaces. In Proceedings of the Second international Conference on Human Language Technology Research (San Diego, California, Mar. 24-27, 2002). Human Language Technology Conference. Morgan Kaufmann Publishers, San Francisco, CA, 331-335.*

(Continued)

*Primary Examiner* — Paras D Shah
(74) *Attorney, Agent, or Firm* — Wolf, Greenfield & Sacks, P.C.

(57) ABSTRACT

Speech-enabled content navigation and control of a distributed multimodal browser is disclosed, the browser providing an execution environment for a multimodal application, the browser including a graphical user agent ('GUA') and a voice user agent ('VUA'), the GUA operating on a multimodal device, the VUA operating on a voice server, that includes: transmitting, by the GUA, a link message to the VUA, the link message specifying voice commands that control the browser and an event corresponding to each voice command; receiving, by the GUA, a voice utterance from a user, the voice utterance specifying a particular voice command; transmitting, by the GUA, the voice utterance to the VUA for speech recognition by the VUA; receiving, by the GUA, an event message from the VUA, the event message specifying a particular event corresponding to the particular voice command; and controlling, by the GUA, the browser in dependence upon the particular event.

20 Claims, 6 Drawing Sheets

(56) References Cited

U.S. PATENT DOCUMENTS

| | | | |
|---|---|---|---|
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 6,606,599 B2 | 8/2003 | Grant et al. | |
| 6,807,529 B2 * | 10/2004 | Johnson et al. | 704/270.1 |
| 6,856,960 B1 | 2/2005 | Dragosh et al. | |
| 6,920,425 B1 | 7/2005 | Will et al. | |
| 6,999,930 B1 | 2/2006 | Roberts et al. | |
| 7,003,464 B2 * | 2/2006 | Ferrans et al. | 704/270.1 |
| 7,035,805 B1 | 4/2006 | Miller | |
| 7,150,399 B2 | 12/2006 | Barrus et al. | |
| 7,158,779 B2 * | 1/2007 | Hon et al. | 455/414.1 |
| 7,171,243 B2 | 1/2007 | Watanabe et al. | |
| 7,188,067 B2 | 3/2007 | Grant et al. | |
| 7,203,907 B2 * | 4/2007 | Weng et al. | 715/748 |
| 7,330,890 B1 | 2/2008 | Partovi et al. | |
| 7,337,405 B2 * | 2/2008 | Weng et al. | 715/748 |
| 7,376,586 B1 | 5/2008 | Partovi et al. | |
| 7,382,770 B2 * | 6/2008 | Bergman et al. | 370/352 |
| 7,383,189 B2 * | 6/2008 | Halonen et al. | 704/275 |
| 7,487,085 B2 | 2/2009 | Cross | |
| 7,487,451 B2 * | 2/2009 | Bodin et al. | 704/270.1 |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0178182 A1 * | 11/2002 | Wang et al. | 707/501.1 |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0073431 A1 * | 4/2004 | Galanes et al. | 704/270.1 |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Farrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong et al. | |
| 2004/0260562 A1 | 12/2004 | Kujirai | |
| 2005/0075884 A1 | 4/2005 | Badt | |
| 2005/0091059 A1 | 4/2005 | Lecoeuche | |
| 2005/0125232 A1 * | 6/2005 | Gadd | 704/270.1 |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/0188411 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273487 A1 * | 12/2005 | Mayblum et al. | 709/202 |
| 2005/0273769 A1 | 12/2005 | Eichenberger et al. | |
| 2005/0283367 A1 | 12/2005 | Cross | |
| 2006/0047510 A1 * | 3/2006 | Ativanichayaphong et al. | 704/235 |
| 2006/0064302 A1 * | 3/2006 | Ativanichayaphong et al. | 704/235 |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0150082 A1 * | 7/2006 | Raiyani et al. | 715/513 |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross, Jr. et al. | |
| 2006/0287865 A1 | 12/2006 | Cross et al. | |
| 2006/0287866 A1 | 12/2006 | Cross, Jr. et al. | |
| 2006/0288309 A1 | 12/2006 | Cross et al | |
| 2007/0124507 A1 * | 5/2007 | Gurram et al. | 710/1 |
| 2007/0133769 A1 * | 6/2007 | Da Palma et al. | 379/142.1 |
| 2007/0260972 A1 * | 11/2007 | Anderl | 715/513 |
| 2007/0265851 A1 | 11/2007 | Cross, Jr. et al. | |
| 2007/0274296 A1 | 11/2007 | Cross, Jr. et al. | |
| 2007/0274297 A1 | 11/2007 | Cross, Jr. et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross, Jr. et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |

FOREIGN PATENT DOCUMENTS

| | | |
|---|---|---|
| CN | 1564123 A | 1/2005 |
| EP | 0794670 A | 9/1997 |
| EP | 1450350 | 8/2004 |
| EP | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

(56) References Cited

FOREIGN PATENT DOCUMENTS

OTHER PUBLICATIONS

Yin, M. and Zhai, S. 2005. Dial and see: tackling the voice menu navigation problem with cross-device user experience integration. In Proceedings of the 18th Annual ACM Symposium on User interface Software and Technology (Seattle, WA, USA, Oct. 23-26, 2005). UIST '05. ACM, New York, NY, 187-190.*

Schneider, T. W. and Balci, O. 2006. VTQuest: a voice-based multimodal web-based software system for maps and directions. In Proceedings of the 44th Annual Southeast Regional Conference (Melbourne, Florida, Mar. 10-12, 2006). ACM-SE 44. ACM, New York, NY, 300-305.*

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. ; PCT/EP2008/051358.

PCT Search Report, Jun. 18, 2008; PCT Application No. ; PCT/EP2008/051363.

Didier Guillevic, et al.,Robust Semantic Confidence Scoring ICSLP 2002: 7$^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19, 2004, Charles W. Cross, Jr.
U.S. Appl. No. 10/733,610, filed Dec. 11, 2003, Charles W. Cross, Jr.
U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

* cited by examiner

SPEECH-ENABLED CONTENT NAVIGATION AND CONTROL OF A DISTRIBUTED MULTIMODAL BROWSER

BACKGROUND OF THE INVENTION

1. Field of the Invention

The field of the invention is data processing, or, more specifically, methods, systems, and products for speech-enabled content navigation and control of a distributed multimodal browser.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. A multimodal browser typically includes a user agent for each mode of user interaction provided by the multimodal browser. Each user agent provides the functionality for interacting with a user in a particular modality. For example, a graphical user agent of a multimodal browser may provide the functionality for interacting with a user through a graphical user interface ('GUI') by processing user input through GUI elements and displaying output on the GUI. A voice user agent of a multimodal browser may provide the functionality for interacting with a user through a voice user interface by recognizing speech input and synthesizing speech output. Because the visual mode of user interaction has historically been the dominate mode of user interaction, the graphical user agent of a multimodal browser typically coordinates the user interaction among all the user agent providing a multimodal experience to a user.

Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. The multimodal browser processes visual markup with a graphical user agent and processes voice markup with a voice user agent. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Multimodal browsers may be categorized generally as local browsers or distributed browsers. A local multimodal browser is a multimodal browser for which all user agents operate on the same computer. For example, in a local multimodal browser having a graphical user agent and a voice user agent, the functionality for processing both visual markup and voice markup of a multimodal application is provided by same computing device. A distributed multimodal browser is a multimodal browser for which the user agents operate on at least two computers. For example, in a distributed multimodal browser having a graphical user agent and a voice user agent, the functionality for processing both visual markup and voice markup of a multimodal application is provided by two separate computing devices. Distributed multimodal browsers are often utilized on small multimodal devices because such devices typically do not have the computer resources needed to run both a graphical user agent and a visual user agent simultaneously.

As mentioned above, a multimodal browser typically provides speech-enabled user interaction. Such speech enablement is typically organized into two categories. The first category is speech-enabling the content of a multimodal application. Speech-enabling the content of a multimodal application may include, for example, synthesizing the text of an X+V page for playback through a speaker of a multimodal device. The second category is speech-enabling content navigation and control of a multimodal browser. Speech-enabling content navigation and control of a multimodal browser may include, for example, allowing a user to navigate the links of an X+V page using voice commands. Speech-enabling content navigation and control of a multimodal browser may also include, for example, allowing a user to open a new window or tab in a multimodal browser using voice commands.

Local multimodal browsers are routinely able to perform both categories of speech-enablement because the voice user agent is available locally to provide voice services such as speech recognition and speech synthesis to the graphical user agent. The ability to perform both categories of speech-enablement is not, however, provided by current distributed multimodal browsers. Distributed multimodal browsers may speech-enable the content of a multimodal application using standard protocols developed for the operation of a distributed multimodal browser across a network such as, for example, the protocols specified by the Open Mobile Alliance and by the Internet Engineering Task Force. Distributed multimodal browsers, however, typically cannot perform speech-enabled content navigation and control because the information needed to speech-enable the interface provided by a graphical user agent is not known, a priori, by a voice user agent. Because current protocols and distributed multimodal browsers do not address this aspect of speech-enablement, readers will appreciate that room for improvement exists to speech-enable content navigation and control of a distributed multimodal browser.

SUMMARY OF THE INVENTION

Methods, systems, and products are disclosed for speech-enabled content navigation and control of a distributed multimodal browser, the distributed multimodal browser providing an execution environment for a multimodal application, the distributed multimodal browser including a graphical user agent and a voice user agent operatively coupled to the graphical user agent, the graphical user agent operating on a multimodal device supporting multiple modes of user interaction including a voice mode and one or more non-voice modes, the voice user agent operating on a voice server, including: transmitting, by the graphical user agent, a link message to the voice user agent, the link message specifying voice commands that control the distributed multimodal browser, the link message also specifying an event corresponding to each voice command; receiving, by the graphical user agent, a voice utterance from a user, the voice utterance specifying a particular voice command; transmitting, by the graphical user agent, the voice utterance to the voice user agent for speech recognition by the voice user agent; receiving, by the graphical user agent, an event message from the voice user agent, the event message specifying a particular event corresponding to the particular voice command specified by the voice utterance; and controlling, by the graphical user agent, the distributed multimodal browser in dependence upon the particular event.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
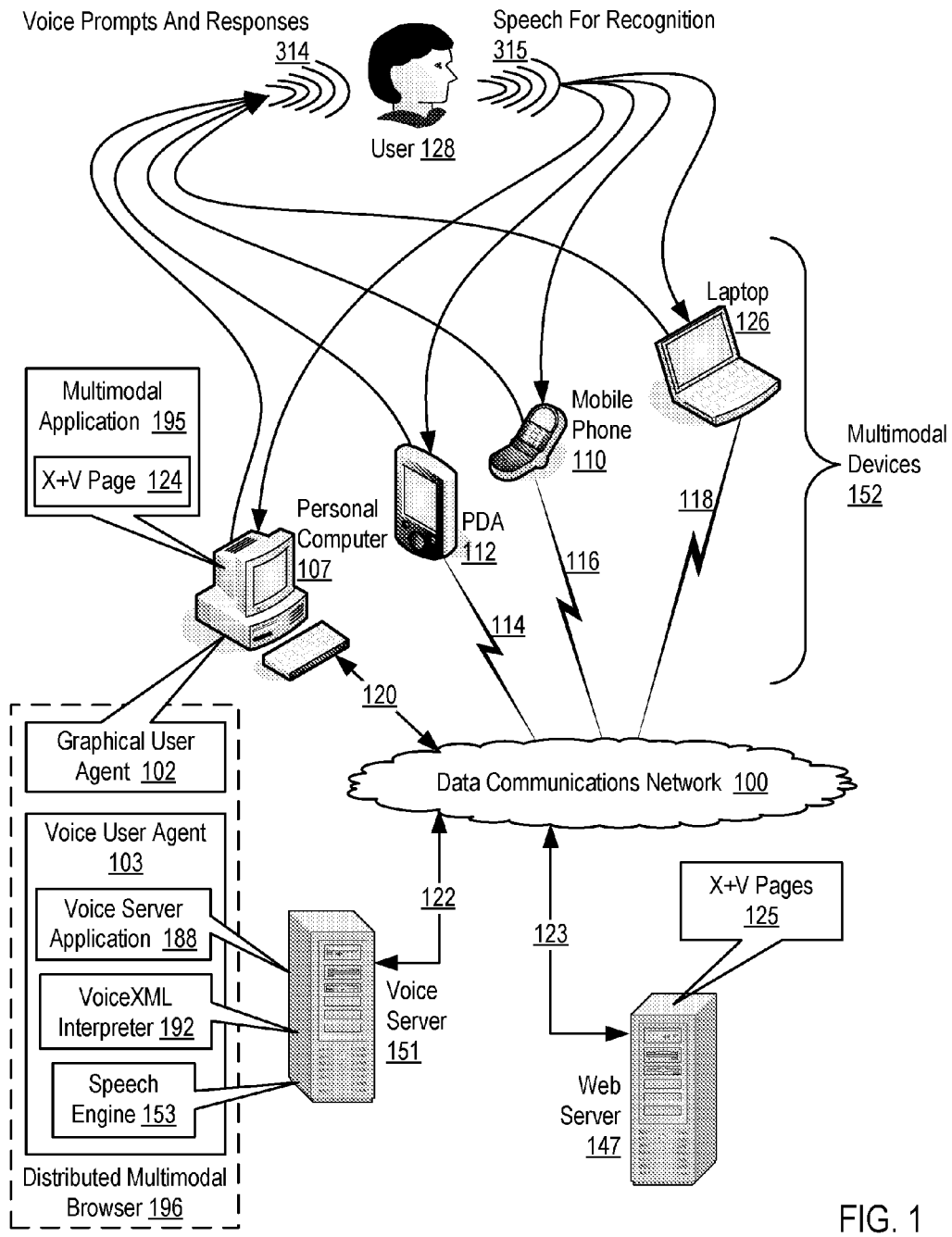
FIG. 1 sets forth a network diagram illustrating an exemplary system for speech-enabled content navigation and control of a distributed multimodal browser according to embodiments of the present invention.

Exemplary methods, apparatus, and products for speech-enabled content navigation and control of a distributed multimodal browser according to embodiments of the present invention are described with reference to the accompanying drawings, beginning with FIG. 1. FIG. 1 sets forth a network diagram illustrating an exemplary system for speech-enabled content navigation and control of a distributed multimodal browser (196) according to embodiments of the present invention. Speech-enabled content navigation and control of a distributed multimodal browser (196) in this example is implemented with a multimodal application (195) operating on a multimodal device (152). The multimodal application (195) of FIG. 1 is composed of at least one X+V page (124) that specifies instructions for rendering content to a user through various modes of user interaction. The multimodal device (152) supports multiple modes of interaction including a voice mode and one or more non-voice modes of user interaction with the multimodal application (195). The voice mode is represented here with audio output of voice prompts and responses (314) from the multimodal devices and audio input of speech for recognition (315) from a user (128). Non-voice modes are represented by input/output devices such as keyboards and display screens on the multimodal devices (152).

The distributed multimodal browser (196) in the example of FIG. 1 is a set of software modules that together provide an execution environment for the multimodal application (195). The distributed multimodal browser (196) of FIG. 1 includes a graphical user agent (102) that provides functionality for interaction between the user (128) and the multimodal application (195) through a visual mode. The distributed multimodal browser (196) of FIG. 1 also includes a voice user agent (103) that provides functionality for interaction between the user (128), the multimodal application (195), and the graphical user agent (102) through a voice mode. In the example of FIG. 1, the graphical user agent (102) operates on the multimodal device (152), and the voice user agent (103) operates on a voice server (151). Although the user agents operate on separate computers, the graphical agent (102) is operatively coupled to the voice user agent (103). The operative coupling may be implemented with an application programming interface ('API'), a voice service module, or a VoIP connection as explained more detail below.

The distributed multimodal browser (196) in the example of FIG. 1 is improved for speech-enabled content navigation and control according to embodiments of the present invention. The distributed multimodal browser (196) of FIG. 1 provides speech-enabled content navigation and control according to embodiments of the present invention as follows: The graphical user agent (102) transmits a link message to the voice user agent (103). The link message specifies voice commands that control the distributed multimodal browser (196) and specifies an event corresponding to each voice command. The graphical user agent (102) receives a voice utterance from a user that specifies a particular voice command. The graphical user agent (102) transmits the voice utterance to the voice user agent (103) for speech recognition by the voice user agent (103). The graphical user agent (102) then receives an event message from the voice user agent (103) that specifies a particular event corresponding to the particular voice command specified by the voice utterance. In dependence upon the particular event specified in the event message, the graphical user agent (102) controls the distributed multimodal browser (196) such as, for example, by navigating content of the multimodal application (195) or by administering a graphical user interface provided by the graphical user agent (102).

Readers will note that the voice user agent (103) receives a voice utterance and a link message from the graphical user agent (102) and, in return, provides the graphical user agent (102) with an event message specifying a particular event. According to embodiments of the present invention, the distributed multimodal browser (196) of FIG. 1 also provides speech-enabled content navigation and control as follows: The voice user agent (103) receives the link message from the graphical user agent (102). The voice user agent (103) receives the voice utterance from the graphical user agent (102). The voice user agent (103) determines the particular event in dependence upon the link message and the voice utterance. The voice user agent (103) transmits the event message to the graphical user agent (102). The event message specifies the particular event specified by the voice utterance.

To support the voice user agent (103) in providing voice services to the graphical user agent (102) and the multimodal application (195), the voice user agent (103) of FIG. 1 includes a VoiceXML interpreter (192). The VoiceXML interpreter (192) is a software module of computer program instructions that accepts voice dialog instructions and other data from a multimodal application, typically in the form of a VoiceXML <form> element, and accepts link messages, default voice dialogs, and other data from a graphical user agent. The voice dialog instructions include one or more grammars, data input elements, event handlers, and so on, that advise the VoiceXML interpreter (192) how to administer voice input from a user and voice prompts and responses to be presented to a user. The link messages typically include a VoiceXML <link> element that specifies one or more voice commands along with events corresponding to each voice command using <link> element attributes, grammars, and semantic interpretation scripts that advise the VoiceXML interpreter (192) which events to activate based on a particular voice utterance specifying a voice command. The VoiceXML interpreter (192) administers such dialogs and link elements by processing the dialog and link instructions sequentially in accordance with a VoiceXML Form Interpretation Algorithm ('FIA'). Because the VoiceXML interpreter (192) typically only processes VoiceXML <link> elements within a FIA and a VoiceXML interpreter (192) typically only initiates a FIA when the VoiceXML interpreter (192) receives a voice dialog, the graphical user agent (102) may provide the default VoiceXML dialog to the VoiceXML interpreter (192) to activate a FIA for processing <link> elements in link messages.

As mentioned above, VoiceXML dialogs and link elements typically include grammars. A grammar communicates to the ASR engine (150) the words and sequences of words that currently may be recognized. In the example of FIG. 1, a grammar includes grammar rules that advise an ASR engine or a voice interpreter which words and word sequences presently can be recognized. Grammars for use according to embodiments of the present invention may be expressed in any format supported by an ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone |
    telephone <name> <when>;
    <name> = bob | martha | joe | pete | chris | john | artoush | tom;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine or a VoiceXML interpreter which words presently can be recognized. In the example above, rule expansions includes conjunction and disjunction, and the vertical bars '|' mean 'or.' An ASR engine or a VoiceXML interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom,' and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

A multimodal device on which a multimodal application operates is an automated device, that is, automated computing machinery or a computer program running on an automated device, that is capable of accepting from users more than one mode of input, keyboard, mouse, stylus, and so on, including speech input—and also providing more than one mode of output such as, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, a multimodal application may refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for speech-enabled content navigation and control of a distributed multimodal browser according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016(CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present invention is capable of providing speech to a speech engine for recognition. The voice user agent (103) of FIG. 1 includes a speech engine (153). The speech engine (153) of FIG. 1 is a functional module, typically a software module, although it may include specialized hardware also, that does the work of recognizing and generating or 'synthesizing' human speech. The speech engine (153) implements speech recognition by use of a further module referred to in this specification as a ASR engine, and the speech engine carries out speech synthesis by use of a further module referred to in this specification as a text-to-speech ('TTS') engine.

The voice user agent (103) of FIG. 1 also includes a voice server application (188). The voice server application (188) of FIG. 1 is a set of computer program instructions capable of operating a voice server in a system that is configured for speech-enabled content navigation and control of a distributed multimodal browser according to embodiments of the present invention. The voice server application (188) of FIG. 1 provides voice recognition services for multimodal devices by accepting requests for speech recognition and VoiceXML processing from the graphical user agent (102) for the graphical user agent itself or on behalf of the multimodal application (195). The voice server application (188) returns to the graphical user agent (102) speech recognition and VoiceXML processing results, including text representing recognized speech, text for use as variable values in dialogs, and text as string representations of scripts for semantic interpretation, and so on. The voice server application (188) typically acts as an intermediary between the graphical user agent (102) and the other components of the voice user agent (103) by accepting requests from the graphical user agent (102) encapsulated in messages and returning to the graphical user agent (102) messages into which voice service responses are packaged.

As shown in FIG. 1, the speech engine (153), the VoiceXML interpreter (192), and voice server application (188) of the voice user agent (103) is installed remotely with respect to the multimodal device, across a data communications network (100) in a voice server (151). A multimodal device that contains only a graphical user agent and does not contain its own voice user agent is said to implement a 'thin multimodal client' or simply a 'thin client,' because the thin multimodal client itself contains only a relatively thin layer of multimodal application software that obtains speech recognition and speech synthesis services from a voice user agent operating on a voice server located remotely across a network from the thin client. In contrast, a multimodal device that contains all the user agents of a multimodal browser is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for voice services across a network from a remote voice server.

A multimodal application (195) in this example provides speech for recognition and text for speech synthesis to the speech engine (153) of the voice user agent (103) through the VoiceXML interpreter (192) of the voice user agent (103). The VoiceXML interpreter (192) of FIG. 1 is installed remotely with respect to the multimodal device, across a data communications network (100) in a voice user agent operating on a voice server (151). The multimodal application (195) provides dialog instructions, VoiceXML <form> elements, grammars, input elements, event handlers, and so on, through the API to the VoiceXML interpreter of the voice user agent (103), and the VoiceXML interpreter administers the speech engine on behalf of the multimodal application.

The VoiceXML interpreter (192) provides grammars, speech for recognition, and text prompts for speech synthesis to the speech engine (153), and the VoiceXML interpreter (192) returns to the multimodal application speech engine (153) output in the form of recognized speech, semantic interpretation results, and digitized speech for voice prompts. In a thin client architecture, the VoiceXML interpreter (192) is located remotely from the multimodal client device in a voice server (151). An API for the VoiceXML interpreter, however, is still implemented in the multimodal device (152), with the API modified to communicate voice dialog instructions, speech for recognition, semantic interpretation results, and text and voice prompts to and from the VoiceXML interpreter on the voice server (151).

The use of these four example multimodal devices (152) is for explanation only, not for limitation of the invention. Any automated computing machinery capable of accepting speech from a user, providing the speech digitized to a remote voice user agent, which includes an ASR engine and a VoiceXML interpreter, and receiving and playing speech prompts and responses from the voice user agent may be improved to function as a multimodal device according to embodiments of the present invention.

The system of FIG. 1 also includes a voice server (151), which is connected to data communications network (100) through wireline connection (122). The voice server (151) is a computer that runs a voice user agent to provide voice services to other user agents of a distributed multimodal browser (196). The voice user agent (103) of FIG. 1 that operates on the voice server (151) includes a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for speech-enabled content navigation and control of a distributed multimodal browser according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol,
a data communications network layer with the Internet Protocol ('IP'),
a transport layer with the Transmission Control Protocol ('TCP') or the User Datagram Protocol ('UDP'),
an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
other protocols as will occur to those of skill in the art.

The system of FIG. 1 also includes a web server (147) connected for data communications through wireline connection (123) to network (100) and therefore to the multimodal devices (152). The web server (147) may be any server that provides to client devices X+V markup documents (125) that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. A multimodal application in a multimodal device then, upon receiving from the web sever (147) an X+V markup document as part of a multimodal application, may execute speech elements by use of a VoiceXML interpreter (192) and speech engine (153) of the voice user agent (103) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for speech-enabled content navigation and control of a distributed multimodal browser according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Speech-enabled content navigation and control of a distributed multimodal browser according to embodiments of the present invention in a thin client architecture may be implemented with one or more voice servers, which are computers, that is, automated computing machinery, that provide speech recognition, speech synthesis, and other voice services. For further explanation, therefore, FIG. 2 sets forth a block diagram of automated computing machinery comprising an example of a computer useful as a voice server (151) in speech-enabled content navigation and control of a distributed multimodal browser according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server (151).

Figure 2:
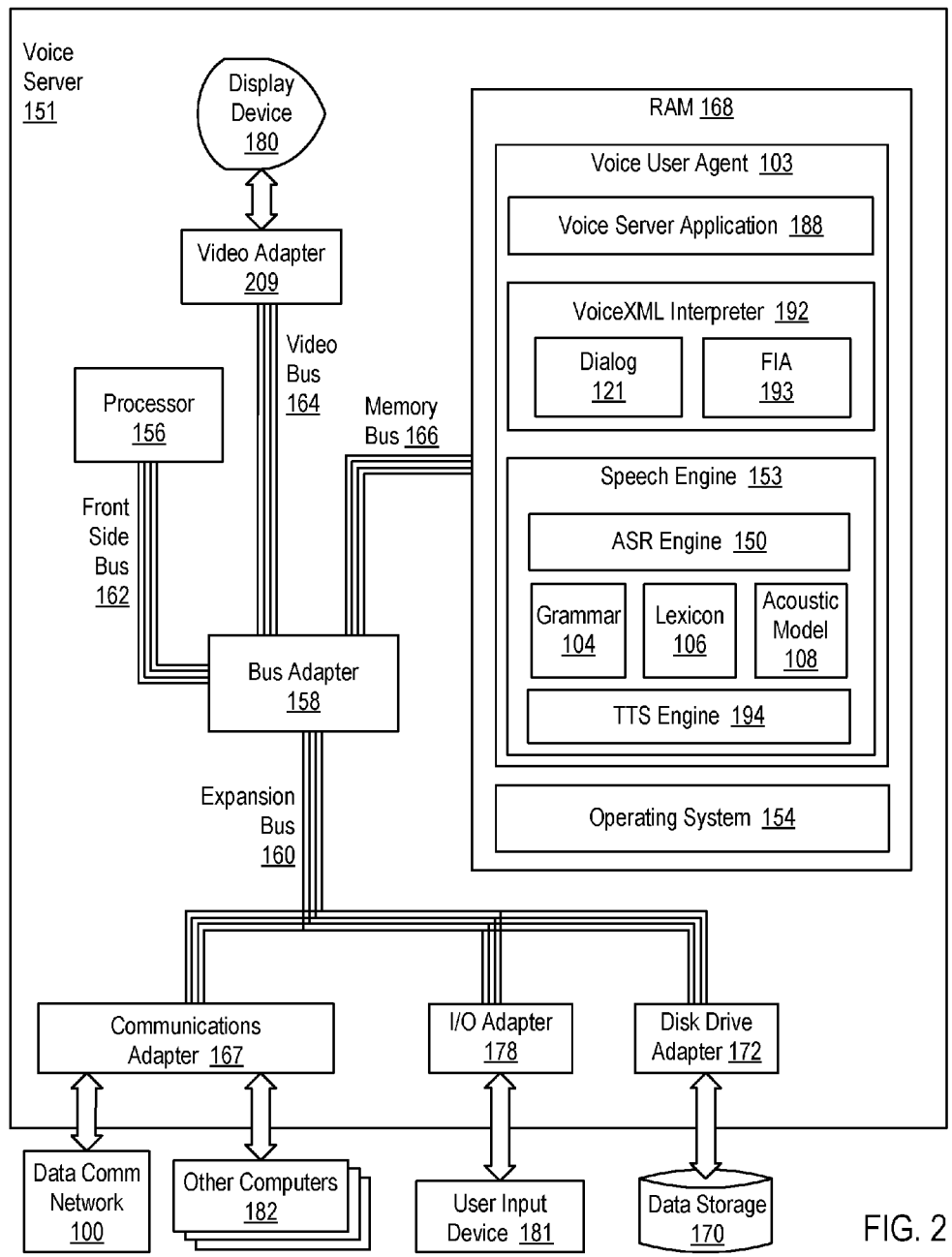
FIG. 2 sets forth a block diagram of automated computing machinery comprising an example of a computer useful as a voice server in speech-enabled content navigation and control of a distributed multimodal browser according to embodiments of the present invention.

Stored in RAM (168) is voice user agent (103), which is a set of modules of computer program instructions capable of providing functionality for interaction between a user, a multimodal application, and a graphical user agent through a voice mode. The voice user agent (103) includes a voice server application (188), a module of computer program instructions capable of operating a voice server in a system that is configured for speech-enabled content navigation and control of a distributed multimodal browser according to embodiments of the present invention. The voice server application (188) of FIG. 2 provides voice recognition services for multimodal devices by accepting requests for speech recognition and VoiceXML processing from the graphical user agent for the graphical user agent itself or on behalf of a multimodal application. The voice server application (188) returns to the graphical user agent speech recognition and VoiceXML processing results, including text representing recognized speech, text for use as variable values in dialogs, and text as string representations of scripts for semantic interpretation, and so on. The voice server application (188) typically acts as an intermediary between the graphical user agent and the other components of the voice user agent (103) by accepting requests from the graphical user agent encapsulated in messages and returning to the graphical user agent messages into which voice service responses are packaged.

As an intermediary, the voice server application (188) provides text-to-speech ('TTS') conversion for voice prompts and voice responses to user input in multimodal applications such as, for example, X+V applications, SALT applications, or Java Speech applications. Voice server application (188) also provides speech-enabled content navigation and control of the multimodal browser by accepting link messages and voice utterances that specify voice commands and events from a graphical user agent and returning particular events, each event corresponding to a voice command, to the graphical user agent for controlling the distributed multimodal browser. Voice server application (188) may be implemented as a web server, implemented in Java, C++, or another language, that supports speech-enabled content navigation and control of a distributed multimodal browser according embodiments of the present invention.

The voice user agent (103) in this example includes a speech engine (153). The speech engine is a functional module, typically a software module, although it may include specialized hardware also, that does the work of recognizing and synthesizing human speech. The speech engine (153) includes an automated speech recognition ('ASR') engine (150) for speech recognition and a text-to-speech ('TTS') engine (194) for generating speech. The speech engine (153) also includes a grammar (104) created by a VoiceXML interpreter (192) in dependence upon predictive texts for a predictive text event. The speech engine (153) also includes a lexicon (106) and a language-specific acoustic model (108). The language-specific acoustic model (108) is a data structure, a table or database, for example, that associates Speech Feature Vectors with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The voice server application (188) in this example is configured to receive, from a multimodal device located remotely across a network from the voice server, digitized speech for recognition from a user and pass the speech along to the ASR engine (150) for recognition. ASR engine (150) is a module of computer program instructions, also stored in RAM in this example. In carrying out speech-enabled content navigation and control of a distributed multimodal browser, the ASR engine (150) receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

In the example of FIG. 2, the voice user agent (103) also includes a VoiceXML interpreter (192). The voice server application (188) passes speech along to the ASR engine (150) for recognition through a VoiceXML interpreter (192)). The VoiceXML interpreter (192) is a software module of computer program instructions that accepts voice dialog instructions and other data from a multimodal application, typically in the form of a VoiceXML <form> element, and accepts link messages, default voice dialogs, and other data from a graphical user agent. The voice dialog instructions include one or more grammars, data input elements, event handlers, and so on, that advise the VoiceXML interpreter (192) how to administer voice input from a user and voice prompts and responses to be presented to a user. The link messages typically include a VoiceXML <link> element that specifies one or more voice commands along with events corresponding to each voice command using <link> element attributes, grammars, and semantic interpretation scripts that advise the VoiceXML interpreter (192) which events to activate based on a particular voice utterance specifying a voice command. The VoiceXML interpreter (192) administers such dialogs and link elements by processing the dialog and link instructions sequentially in accordance with a VoiceXML Form Interpretation Algorithm ('FIA') (193). Because the VoiceXML interpreter (192) typically only processes VoiceXML <link> elements within a FIA and the FIA is typically only initiated when the VoiceXML interpreter (192) receives a voice dialog, the graphical user agent (102) may provide the default VoiceXML dialog to the VoiceXML interpreter (192) to activate a FIA for processing <link> elements in link messages.

The exemplary voice server (151) of FIG. 2 is useful in a system for speech-enabling content navigation and control according to embodiments of the present invention. Such a system may operate generally for speech-enabling content navigation and control according to embodiments of the present invention as follows: A graphical user agent transmits a link message to the voice user agent (103). The link message specifies voice commands that control the distributed multimodal browser and specifies an event corresponding to each voice command. The graphical user agent receives a voice utterance from a user. The voice utterance specifies a particular voice command. The graphical user agent transmits the voice utterance to the voice user agent (103) for speech recognition by the voice user agent (103). The graphical user agent then receives an event message from the voice user agent (103). The event message specifies a particular event corresponding to the particular voice command specified by the voice utterance. The graphical user agent controls the distributed multimodal browser in dependence upon the particular event.

Readers will note that the voice user agent (103) receives a voice utterance and a link message from a graphical user agent and, in return, provides the graphical user agent with an event message specifying a particular event. According to embodiments of the present invention, the voice user agent (103) of FIG. 2 also provides speech-enabled content navigation and control as follows: The voice user agent (103) receives a link message and a voice utterance from a graphical user agent. The voice user agent (103) then determines a particular event in dependence upon the link message and the voice utterance. The voice user agent (103) transmits the event message to the graphical user agent. The event message specifies the particular event specified by the voice utterance.

Also stored in RAM (168) is an operating system (154). Operating systems useful in voice servers according to embodiments of the present invention include UNIX™, Linux™, Microsoft NT™, IBM's AIX™, IBM's i5/OS™, and others as will occur to those of skill in the art. Operating system (154), voice server application (188), VoiceXML interpreter (192), speech engine (153), including ASR engine (150), and TTS Engine (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for speech-enabled content navigation and control of a distributed multimodal browser according to embodiments of the present invention include modems for wired dial-up communications, Ethernet (IEEE 802.3) adapters for wired data communications network communications, and 802.11 adapters for wireless data communications network communications.

Figure 3:
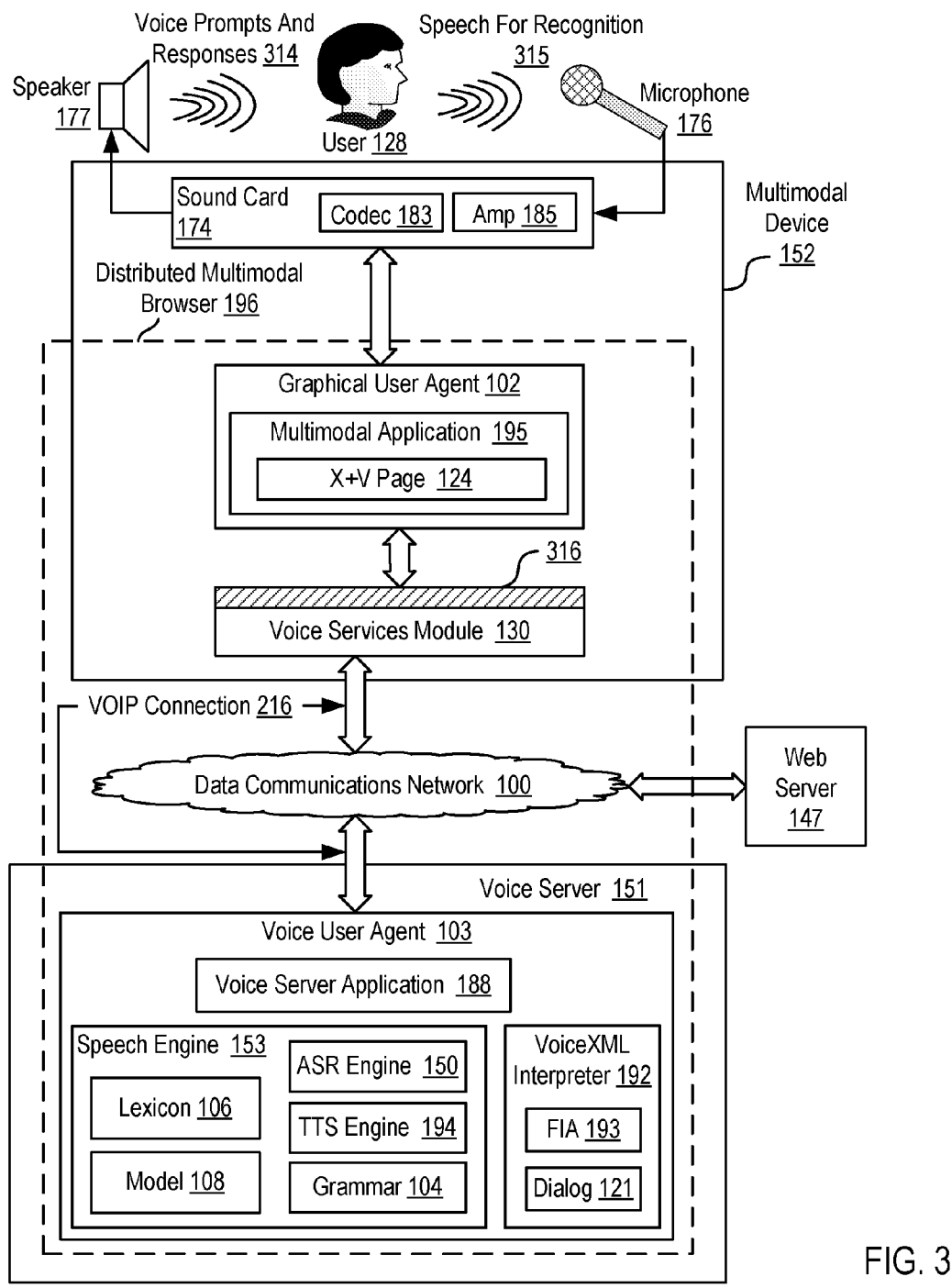
FIG. 3 sets forth a functional block diagram of exemplary apparatus for speech-enabled content navigation and control of a distributed multimodal browser according to embodiments of the present invention.

For further explanation, FIG. 3 sets forth a functional block diagram of exemplary apparatus for speech-enabled content navigation and control of a distributed multimodal browser according to embodiments of the present invention. Speech-enabled content navigation and control of a distributed multimodal browser (196) in this example is implemented with a multimodal application (195) operating on a multimodal device (152). The multimodal application (195) of FIG. 1 is composed of at least one X+V page (124) that specifies instructions for rendering content to a user through various modes of user interaction.

The distributed multimodal browser (196) in the example of FIG. 3 is a set of software modules that together provide an execution environment for the multimodal application (195). The distributed multimodal browser (196) of FIG. 3 includes a graphical user agent (102) that provides functionality for interaction between the user (128) and the multimodal application (195) through a visual mode. The distributed multimodal browser (196) of FIG. 3 also includes a voice user agent (103) that provides functionality for interaction between the user (128), the multimodal application (195), and the graphical user agent (102) through a voice mode. In the example of FIG. 3, the graphical user agent (102) operates on the multimodal device (152), and the voice user agent (103) operates on a voice server (151). Although the user agents operate on separate computers, the graphical agent (102) is operatively coupled to the voice user agent (103). The operative coupling may be implemented with an application programming interface ('API'), a voice service module, or a VoIP connection as explained more detail below.

The distributed multimodal browser (196) in the example of FIG. 3 is improved for speech-enabled content navigation and control according to embodiments of the present invention. The distributed multimodal browser (196) of FIG. 3 provides speech-enabled content navigation and control according to embodiments of the present invention as follows: The graphical user agent (102) transmits a link message to the voice user agent (103) that specifies voice commands that control the distributed multimodal browser (196) and specifies an event corresponding to each voice command. The graphical user agent (102) receives a voice utterance from a user that specifies a particular voice command. The graphical user agent (102) transmits the voice utterance to the voice user agent (103) for speech recognition by the voice user agent (103). The graphical user agent (102) then receives an event message from the voice user agent (103) that specifies a particular event corresponding to the particular voice command specified by the voice utterance. In dependence upon the particular event specified in the event message, the graphical user agent (102) controls the distributed multimodal browser (196) such as, for example, by navigating content of the multimodal application (195) or by administering a graphical user interface provided by the graphical user agent (102).

Readers will note that the voice user agent (103) receives a voice utterance and a link message from the graphical user agent (102) and, in return, provides the graphical user agent (102) with an event message specifying a particular event. According to embodiments of the present invention, the distributed multimodal browser (196) of FIG. 3 also provides speech-enabled content navigation and control as follows: The voice user agent (103) receives the link message from the graphical user agent (102). The voice user agent (103) receives the voice utterance from the graphical user agent (102). The voice user agent (103) determines the particular event in dependence upon the link message and the voice utterance. The voice user agent (103) transmits the event message to the graphical user agent (102). The event message specifies the particular event specified by the voice utterance.

In the example of FIG. 3, the multimodal device (152) supports multiple modes of interaction including a voice mode and one or more non-voice modes. The exemplary multimodal device (152) of FIG. 3 supports voice with a sound card (174), which is an example of an I/O adapter specially designed for accepting analog audio signals from a microphone (176) and converting the audio analog signals to digital form for further processing by a codec (183). The example multimodal device (152) of FIG. 3 may support non-voice modes of user interaction with keyboard input, mouseclicks, a graphical user interface ('GUI'), and so on, as will occur to those of skill in the art.

In the example of FIG. 3, the voice user agent (103) includes a voice server application (188), a module of computer program instructions capable of operating a voice server in a system that is configured for speech-enabled content navigation and control of a distributed multimodal browser according to embodiments of the present invention. The voice server application (188) of FIG. 3 provides voice recognition services for multimodal devices by accepting requests for speech recognition and VoiceXML processing from the graphical user agent (102) for the graphical user agent itself or on behalf of the multimodal application (195). The voice server application (188) returns to the graphical user agent (102) speech recognition and VoiceXML processing results, including text representing recognized speech, text for use as variable values in dialogs, and text as string representations of scripts for semantic interpretation, and so on. The voice server application (188) typically acts as an intermediary between the graphical user agent (102) and the other components of the voice user agent (103) by accepting requests from the graphical user agent (102) encapsulated in messages and returning to the graphical user agent (102) messages into which voice service responses are packaged.

As an intermediary, the voice server application (188) provides text-to-speech ('TTS') conversion for voice prompts and voice responses to user input in multimodal applications such as, for example, X+V applications, SALT applications, or Java Speech applications. Voice server application (188) also provides speech-enabled content navigation and control of the multimodal browser by accepting link messages and voice utterances that specify voice commands and events from a graphical user agent and returning particular events, each event corresponding to a voice command, to the graphical user agent for controlling the distributed multimodal browser. Voice server application (188) may be implemented as a web server, implemented in Java, C++, or another language, that supports speech-enabled content navigation and control of a distributed multimodal browser according embodiments of the present invention.

In addition to the voice sever application (188), the voice user agent (103) also includes a speech engine (153) with an ASR engine (150), a grammar (104), a lexicon (106), a language-specific acoustic model (108), and a TTS engine (194), as well as a Voice XML interpreter (192) that includes a form interpretation algorithm (193). VoiceXML interpreter (192) interprets and executes a VoiceXML dialog (121) received from the multimodal application and provided to VoiceXML interpreter (192) through voice server application (188). Input to VoiceXML interpreter (192) may originate from the multimodal application (195) implemented as an X+V client running remotely in the distributed multimodal browser (196) on the multimodal device (152) or from the graphical user agent (102) running remotely on the multimodal device (152). The VoiceXML interpreter (192) administers such input, dialogs and other VoiceXML instructions, by processing the instructions sequentially in accordance with a VoiceXML Form Interpretation Algorithm ('FIA') (193).

VoIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VoIP' protocols. VoIP traffic may be deployed on any IP data communications network, including data communications networks lacking a connection to the rest of the Internet, for instance on a private building-wide local area data communications network or 'LAN.'

Many protocols are used to effect VoIP. The two most popular types of VoIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VoIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition (315) through microphone (176) and have the speech digitized through an audio amplifier (185) and a coder/decoder ('codec') (183) of a sound card (174) and provide the digitized speech for recognition to ASR engine (150). Multimodal application (195), through the multimodal browser (196), an API (316), and a voice services module (130), then packages the digitized speech in a recognition request message according to a VoIP protocol, and transmits the speech to voice server (151) through the VoIP connection (216) on the network (100).

Voice server application (188) provides voice recognition services for multimodal devices by accepting dialog instructions and other data, and returning speech recognition results, including text representing recognized speech, text for use as variable values in dialogs, and output from execution of semantic interpretation scripts—as well as voice prompts. Voice server application (188) includes computer program instructions that provide text-to-speech ('TTS') conversion for voice prompts and voice responses to user input in multimodal applications providing responses to HTTP requests from multimodal browsers running on multimodal devices.

The voice server application (188) receives speech for recognition and VoiceXML instructions from the graphical user agent (102) and passes the speech and instructions through API calls to VoiceXML interpreter (192), which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

In the example of FIG. 3, the graphical user agent (102) is operatively coupled to the voice user agent (103). In this example, the operative coupling between the graphical user agent (102) and the voice user agent (103) is implemented with a VoIP connection (216) through a voice services module (130). The voice services module is a thin layer of functionality, a module of computer program instructions, that presents an API (316) for use by the graphical user agent (102) to access the voice user agent (103). Through the voice services module (130), the graphical user agent (102) provides dialogs (121) and speech for recognition to a VoiceXML interpreter and receives in response voice prompts and other responses, including events that correspond to voice commands issued by the user (128) according to embodiments of the present invention. The VoiceXML interpreter (192), in turn, utilizes the speech engine (153) for speech recognition and synthesization services.

In the example of FIG. 3, the voice services module (130) provides data communications services through the VoIP connection and the voice server application (188) between the multimodal device (152) and the voice user agent (103). The API (316) is the same API presented to applications by voice user agent when the voice user agent is installed on the multimodal device in a thick client architecture. So from the point of view of a graphical user agent calling the API (316), the graphical user agent is calling the voice user agent directly. The data communications functions of the voice services module (130), therefore, are transparent to graphical user agent that calls the API (316).

Speech-enabled content navigation and control of a distributed multimodal browser of a multimodal application according to embodiments of the present invention is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in speech-enabled content navigation and control of a distributed multimodal browser according to embodiments of the present invention.

Figure 4:
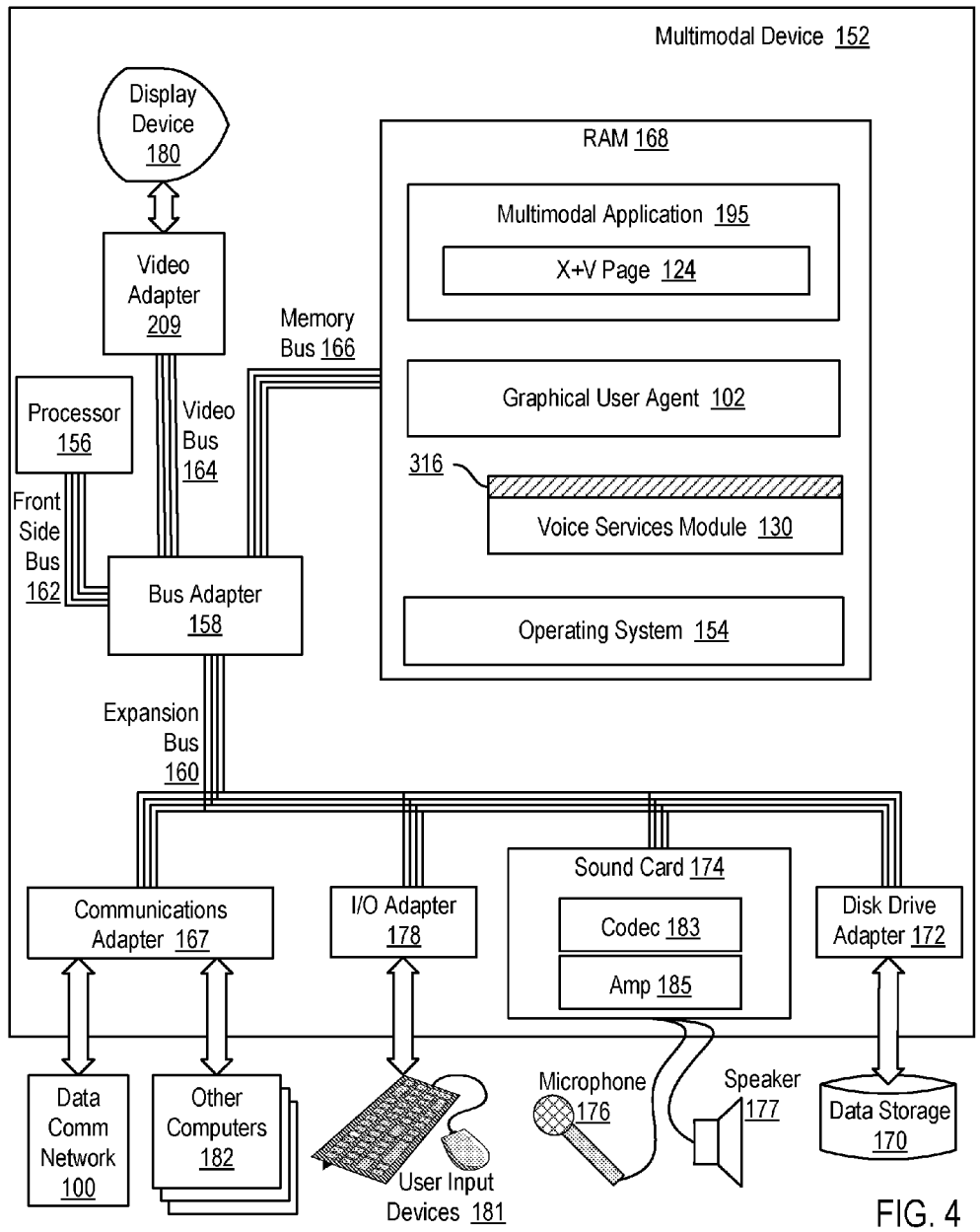
FIG. 4 sets forth a block diagram of automated computing machinery comprising an example of a computer useful as a multimodal device in speech-enabled content navigation and control of a distributed multimodal browser according to embodiments of the present invention.

The example multimodal device (152) of FIG. 4 includes several components that are structured and operate similarly to parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154). The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Stored in RAM (168) in this example is a multimodal application (195) operating in a distributed multimodal browser on a multimodal device (152). The distributed multimodal browser provides an execution environment for the multimodal application (195). The multimodal application (195) of FIG. 1 is composed of at least one X+V page (124) that specifies instructions for rendering content to a user through various modes of user interaction. The multimodal device (152) supports multiple modes of interaction including a voice mode and one or more non-voice modes of user interaction with the multimodal application (195). The voice mode may be implemented using the sound card (174), microphone (176), and speaker (177). Non-voice modes may be implemented using other input/output devices such as keyboards and display screens on the multimodal devices (152).

Stored in RAM (168) in this example is a graphical user agent (102). The graphical user agent (102) of FIG. 4 provides functionality for interaction between a user and the multimodal application (195) through a visual mode. The graphical user agent (102) of FIG. 4 also includes a set of computer program instruction that support speech-enabled content navigation and control of a distributed multimodal browser according to embodiments of the present invention. The graphical user agent (102) of FIG. 4 operates generally for supporting speech-enabled content navigation and control of a distributed multimodal browser according to embodiments of the present invention as follows: The graphical user agent (102) transmits a link message to the voice user agent (103) that specifies voice commands that control the distributed multimodal browser (196) and specifies an event corresponding to each voice command. The graphical user agent (102) receives a voice utterance from a user that specifies a particular voice command. The graphical user agent (102) transmits the voice utterance to the voice user agent (103) for speech recognition by the voice user agent (103). The graphical user agent (102) then receives an event message from the voice user agent (103) that specifies a particular event corresponding to the particular voice command specified by the voice utterance. In dependence upon the particular event specified in the event message, the graphical user agent (102) controls the distributed multimodal browser (196) such as, for example, by navigating content of the multimodal application (195) or by administering a graphical user interface provided by the graphical user agent (102).

Readers will note that a voice user agent receives a voice utterance and a link message from the graphical user agent (102) and, in return, provides the graphical user agent (102) with an event message specifying a particular event. According to embodiments of the present invention, such a voice user agent of FIG. 1 operates generally for speech-enabled content navigation and control as follows: The voice user agent receives the link message and a voice utterance from the graphical user agent (102). The voice user agent determines a particular event corresponding to a voice command specified in the voice utterance in dependence upon the link message and the voice utterance. The voice user agent transmits the event message to the graphical user agent (102). The event message specifies the particular event specified by the voice utterance.

As mentioned above, the graphical user agent (102) is operatively coupled to the voice user agent (103). To implement the operative coupling between the graphical user agent (102) and the voice user agent (103), the RAM (168) in this example stores a voice services module (130). The voice services module (130) is a thin layer of functionality, a module of computer program instructions, that presents an API (316) for use by the graphical user agent (102) to access the voice user agent (103) operating on a voice server. Through the voice services module (130), the graphical user agent (102) provides dialogs, link messages, and other data to a voice user agent and receives in response prompts, event messages, and other data.

The multimodal device (152) in the example of FIG. 4 is remotely connected to a voice server through data communications network (100). Because the voice user agent operates in the remote voice server, the multimodal browser in this example is referred to a distributed multimodal browser. The multimodal device (152) of FIG. 4 is therefore an example of a so-called 'thin client architecture.'

Figure 5:
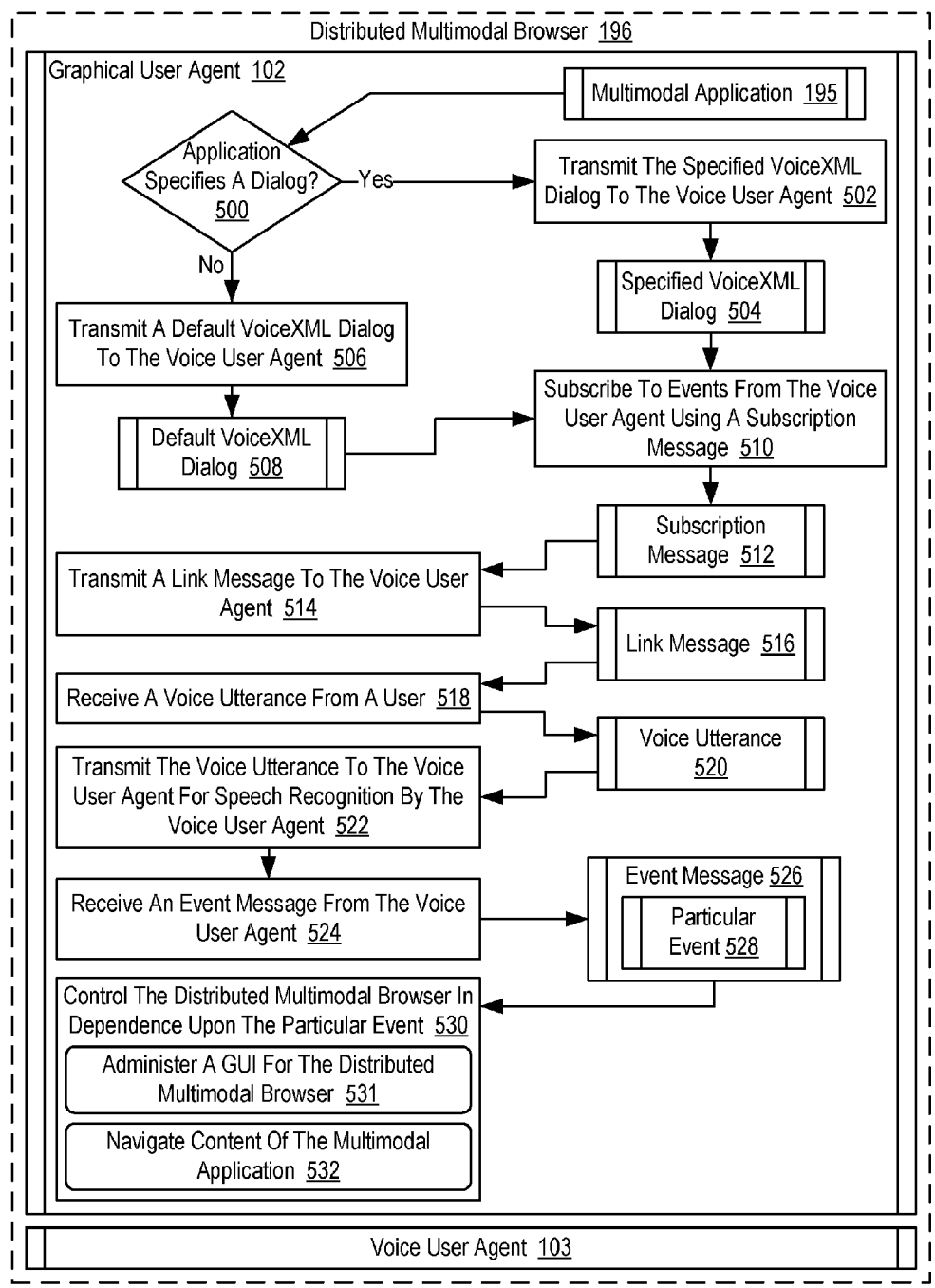
FIG. 5 sets forth a flow chart illustrating an exemplary method of speech-enabled content navigation and control of a distributed multimodal browser according to embodiments of the present invention.

For further explanation, FIG. 5 sets forth a flow chart illustrating an exemplary method of speech-enabled content navigation and control of a distributed multimodal browser according to embodiments of the present invention. Speech-enabled content navigation and control of a distributed multimodal browser in this example is implemented with a multimodal application (195), composed of at least one X+V page (124). The multimodal application (195) operates on a multimodal device supporting multiple modes of interaction including a voice mode and one or more non-voice modes of user interaction with the multimodal application. The voice mode may be implemented in this example with audio output through a speaker and audio input through a microphone. Non-voice modes may be implemented by user input devices such as, for example, a keyboard and a mouse.

In the example of FIG. 5, the distributed multimodal browser (196) provides an execution environment for a multimodal application (195). The distributed multimodal browser (196) of FIG. 5 includes a graphical user agent (102) that provides functionality for interaction between a user and the multimodal application (195) through a visual mode of user interaction. The distributed multimodal browser (196) of FIG. 5 also includes a voice user agent (103) that provides functionality for interaction between a user, the multimodal application (195), and the graphical user agent (102) through a voice mode of user interaction. In the example of FIG. 5, the graphical user agent (102) operates on the multimodal device (152), and the voice user agent (103) operates on a voice server (151). Although the user agents operate on separate computers, the graphical user agent (102) is operatively coupled to the voice user agent (103). The operative coupling may be implemented with an application programming interface ('API'), a voice service module, and a VoIP connection as described above.

The method of FIG. 5 includes determining (500), by the graphical user agent (102), whether the multimodal application (195) specifies a VoiceXML dialog. The graphical user agent (102) may determine (500) whether the multimodal application (195) specifies a VoiceXML dialog according to the method of FIG. 5 to determine whether the voice user agent (103) will be executing a Form Interpretation Algorithm ('FIA') when the graphical user agent (102) transmits a link message (516) to the voice user agent (103) as discussed below. If the voice user agent (103) is not executing a FIA when the graphical user agent (102) transmits the link message (516) to the voice user agent (103), then the voice user agent will not be able to process the VoiceXML <link> element contained in the link message (516) and therefore not able to voice-enable control of the distributed multimodal browser (196).

The graphical user agent (102) may determine (500) whether the multimodal application (195) specifies a VoiceXML dialog according to the method of FIG. 5 by identifying whether the multimodal application (195) contains a VoiceXML <form> element. A VoiceXML <form> element contains dialog instructions for presenting information and collecting data from a user. If the multimodal application (195) contains a VoiceXML <form> element, then the multimodal application (195) specifies a VoiceXML dialog. If the multimodal application (195) does not contain a VoiceXML <form> element, then the multimodal application (195) does not specify a VoiceXML dialog.

The method of FIG. 5 includes transmitting (506), by the graphical user agent (102), the specified VoiceXML dialog (504) to the voice user agent (103) if the multimodal application (195) does specify the VoiceXML dialog. The graphical user agent (102) may transmit (506) the specified VoiceXML dialog (504) to the voice user agent (103) according to the method of FIG. 5 by storing the specified VoiceXML dialog (504) in the page source field of a 'load source' message and transmitting the load source message along with an 'execute form' message to voice user agent (103) through the operative coupling between the graphical user agent (102) and the voice user agent (103). A load source message and an execute form message may implemented using the 'CMD_LOAD_SRC' and 'CMD_EXEC_FORM,' respectively, specified in the Internet Draft of the Distributed Multimodal Synchronization Protocol ('DMSP') promulgated by the Internet Engineering Task Force. As specified in the DMSP, the CMD_LOAD_SRC message includes a page source field, which is a string containing a conforming VoiceXML 2.0 document.

The method of FIG. 5 also includes transmitting (506), by the graphical user agent (102), a default VoiceXML dialog (508) to the voice user agent (103) if the multimodal application (195) does not specify the VoiceXML dialog. The default VoiceXML dialog (508) represents a VoiceXML dialog that is provided to the voice user agent (103) to active a FIA in the voice user agent (103). The default VoiceXML dialog (508) may be specified using VoiceXML <form> element. An example of a default VoiceXML dialog may include the following exemplary VoiceXML dialog:

```
<vxml:form id="__cmd">
    <vxml:field name="dummy" type="boolean"/>
    <vxml:block name="block1">
        <assign name="dummy" expr="undefined"/>
        <assign name="block1" expr="undefined"/>
    </vxml:block>
</vxml:form>
```

The graphical user agent (102) may transmit (506) a default VoiceXML dialog (508) to the voice user agent (103) according to the method of FIG. 5 by storing the default VoiceXML dialog (508) in a 'load default form' message and transmitting the load default form message to voice user agent (103) through the operative coupling between the graphical user agent (102) and the voice user agent (103). For example, consider the following exemplary load default form message:

| LOAD DEFAULT FORM MESSAGE | | | |
| --- | --- | --- | --- |
| FIELD | TYPE | BYTE LENGTH | VALUE |
| Message Type | Integer | 1 | MSG_COMMAND |
| Message Subtype | Integer | 1 | CMD_LOAD_DEFAULT_FORM |
| Correlation | Integer | 4 | |

LOAD DEFAULT FORM MESSAGE

| FIELD | TYPE | BYTE LENGTH | VALUE |
|---|---|---|---|
| Form Source | String | Variable | |
| Base URI | String | Variable | |

The exemplary load default form message above includes five fields. The 'Message Type' field stores the message type of the exemplary load default form message. The 'Message Subtype' field stores the message subtype of the exemplary load default form message. The 'Correlation' field stores the message's sequence number to match the command message with a corresponding response message. The 'Form Source' field stores a string containing a VoiceXML <form> element specifying the default VoiceXML dialog. The 'Base URI' field stores a string containing a Uniform Resource Identifier ('URI') used to resolve local references in the default VoiceXML dialog. Readers will note that the exemplary default VoiceXML dialog above and the exemplary load default form message are for explanation only and not for limitation.

The method of FIG. 5 also includes subscribing (510), by the graphical user agent (102), to events from the voice user agent (103) using a subscription message (512). The subscription message (512) represents a request by a graphical user agent to receive certain events from a voice user agent. The graphical user agent (102) may subscribe (510) to events from the voice user agent (103) according to the method of FIG. 5 by encoding identifiers for events of interest in a subscription message and transmitting the subscription message to the voice user agent (103) through the operative coupling between the graphical user agent (102) and the voice user agent (103). An event of interest to a graphical user agent may include an event instructing the graphical user agent to open a new window or tab on a GUI, to navigate to a document specified by a hyperlink in the multimodal application (195), to open a menu on a GUI of the graphical user agent (102), or any other events as will occur to those of skill in the art. An event identifier for an event of interest to the graphical user may be specified as a string using dot notation. Consider, for example, an event instructing the graphical user agent to navigate to a 'chapter 3' document specified by a hyperlink of the current page in the multimodal application. The identifier for such an event may be specified as follows:

navigatelink.chapter3.html

When multiple events of the same type are of interest to the graphical user agent (102), the graphical user agent (102) may specify the events using wildcard characters such as, for example '*.' The following string specifies all events instructing the graphical user agent to navigate to a document specified by a hyperlink in the multimodal application:

navigatelink.*

As mentioned above, the graphical user agent (102) may encode identifiers for events of interest in a subscription message. For example, consider the following exemplary subscription message identified as 'add string event listener'

ADD STRING EVENT LISTENER MESSAGE

| FIELD | TYPE | BYTE LENGTH | VALUE |
|---|---|---|---|
| Message Type | Integer | 1 | MSG_COMMAND |
| Message Subtype | Integer | 1 | CMD_ADD_STR_EVT_LSTNR |
| Correlation | Integer | 4 | |
| Target Node URI | String | Variable | Node ID or "*" |
| Event | String | Variable | |

The exemplary add string event listener message above includes five fields. The 'Message Type' field stores the message type of the exemplary load default form message. The 'Message Subtype' field stores the message subtype of the exemplary load default form message. The 'Correlation' field stores the message's sequence number to match the command message with a corresponding response message. The 'Target Node URI' field stores a string containing the URI of the VoiceXML <link> element that may produce the events of interest or stores a '*' to subscribe to all string events. The 'Event' field stores identifiers for events of interest as a string using dot notation. Readers will note that the exemplary add string event listener message is for explanation only and not for limitation.

The method of FIG. 5 includes transmitting (514), by the graphical user agent (102), a link message (516) to the voice user agent (103). The link message (516) of FIG. 5 represents a message that links voice commands for controlling a distributed multimodal browser with events used to process the voice commands. The link message (516) of FIG. 5 specifies voice commands that control the distributed multimodal browser (196) and specifies an event corresponding to each voice command. For example, the link message (516) may link the voice command 'browser new window' with the event identified by the identifier 'command.new.window.' The graphical user agent (102) may transmit (514) a link message (516) to the voice user agent (103) according to the method of FIG. 5 by storing a VoiceXML link element that specifies relationships between voice commands and events into the link message (516) and passing the link message (516) to the voice user agent (103) through the operative coupling between the graphical user agent (102) and the voice user agent (103).

In the example of FIG. 5, the link message (516) includes a VoiceXML link element. The VoiceXML link element may specify the relationships between voice commands and events. For example, consider the following exemplary VoiceXML link element:

```
<vxml:link id="c3nlink"
eventexpr="application.lastresult$.interpretation.c3n">
  <vxml:grammar>
    <![CDATA[
    #JSGF V1.0;
    grammar c3nfinal;
    public <c3nfinal> = <c3n> {$.c3n = $c3n;};
    <c3n> = browser (<command>
    {$ = "command."+$command} | <link> {$ =
        "link."+$link});
    <command> = <history> {$ = $history} | <file> {$ = $file};
    <history> = [go] back {$ = "back"} | forward {$ = "forward"};
    <file> = "new page" {$ = "new.page"} |
    "new window" {$ = "new.window"};
    <link> = [ "go to" | "jump to" ]
    <documentlinks>{$ = $documentlinks};
```

```
    <documentlinks> = Glossary {$ = "glossary.html"}
        | Contents {$ = "contents.html"}
        | Next Page {$ = "chapter3.html"}
        | Previous Page {$ = "chapter1.html"};]]>
    </vxml:grammar>
    </vxml:link>
```

The exemplary VoiceXML link element above includes an exemplary grammar that specifies various voice commands for controlling a distributed multimodal browser. Using the exemplary grammar above, a speech engine may recognize the following voice commands:

browser go back
    browser forward
    browser new page
    browser new window
    browser go to Glossary
    browser jump to Contents
    browser jump to Next Page
    browser go to Previous Page Using semantic interpretation scripts in the exemplary grammar above, the exemplary VoiceXML link element above associates an event with each voice command. As the voice user agent (103) processes the grammar, the voice user agent (103) builds an event identifier for a particular event that matches voice command spoken by a user. The event identifiers associated with each event in the exemplary VoiceXML link element above are as follows:

| VOICE COMMAND | EVENT IDENTIFIER |
|---|---|
| browser go back | command.back |
| browser forward | command.forward |
| browser new page | command.new.page |
| browser new window | command.new.window |
| browser go to Glossary | link.glossary.html |
| browser jump to Contents | link.contents.html |
| browser jump to Next Page | link.chapter3.html |
| browser go to Previous Page | link.chapter1.html |

As mentioned above, the graphical user agent (102) may store a VoiceXML link element that specifies relationships between voice commands and events into the link message (516). An example of a link message may include the following exemplary link message:

| LINK MESSAGE | | | |
|---|---|---|---|
| FIELD | TYPE | BYTE LENGTH | VALUE |
| Message Type | Integer | 1 | MSG_COMMAND |
| Message Subtype | Integer | 1 | CMD_LOAD_LINK |
| Correlation | Integer | 4 | |
| Source | String | Variable | |
| Document URL | String | Variable | |

The exemplary link message above includes five fields. The 'Message Type' field stores the message type of the exemplary load default form message. The 'Message Subtype' field stores the message subtype of the exemplary load default form message. The 'Correlation' field stores the message's sequence number to match the command message with a corresponding response message. The 'Source' field stores a string containing the VoiceXML <link> element that specifies voice commands that control the distributed multimodal browser (196) and specifies an event corresponding to each voice command. The 'Document URL' field stores the Uniform Resource Locator of the document to which the Voice XML link element is to be added. If the 'Document URL' field is empty, then the Voice XML link element is added to the last document specified by the 'CMD_LOAD_SRC' message or 'CMD_LOAD_URL,' which the graphical user agent (102) sent to the voice user agent (103) in accordance with the Distributed Multimodal Synchronization Protocol. Readers will note that the exemplary VoiceXML link element and the exemplary link message are for explanation only and not for limitation.

The method of FIG. 5 includes receiving (518), by the graphical user agent (102), a voice utterance (520) from a user. The voice utterance (520) of FIG. 5 represents digitized human speech provided to the graphical user agent (102) by a user of a multimodal device. In the example of FIG. 5, the voice utterance (520) specifies a particular voice command for controlling the distributed multimodal browser such as, for example, 'browser go back,' 'browser go forward,' 'browser jump to Next Page,' and so on. The graphical user agent (102) may acquire the voice utterance (520) from a user through a microphone and a soundcard installed in the multimodal device. The soundcard may encode the voice utterance in a suitable format for storage and transmission using any CODEC as will occur to those of skill in the art.

The method of FIG. 5 also includes transmitting (522), by the graphical user agent (102), the voice utterance (520) to the voice user agent (103) for speech recognition by the voice user agent (103). The graphical user agent (102) may transmit (522) the voice utterance (520) to the voice user agent (103) for speech recognition by the voice user agent (103) according to the method of FIG. 5 through the operative coupling between the graphical user agent (102) and the voice user agent (103). That is, the graphical user agent (102) may transmit (522) the voice utterance (520) to the voice user agent (103) for speech recognition by the voice user agent (103) according to the method of FIG. 5 using a function exposed by an API of a voice services module installed on the multimodal device.

The method of FIG. 5 includes receiving (524), by the graphical user agent (102), an event message (526) from the voice user agent (103). The event message (526) of FIG. 5 specifies a particular event (528) corresponding to the particular voice command specified by the voice utterance (520). The event message (526) specifies the particular event as a string using dot notation as discussed above. An example of an event message may include the following exemplary event message:

| EVENT MESSAGE | | | |
|---|---|---|---|
| FIELD | TYPE | BYTE LENGTH | VALUE |
| Message Type | Integer | 1 | MSG_COMMAND |
| Message Subtype | Integer | 1 | CMD_DISPATCH_STR_EVT |
| Correlation | Integer | 4 | |
| Event | String | Variable | |

The exemplary event message above includes four fields. The 'Message Type' field stores the message type of the exemplary load default form message. The 'Message Subtype' field stores the message subtype of the exemplary load default form message. The 'Correlation' field stores the message's sequence number to match the command message with a corresponding response message. The 'Event' field stores an event identifier that specifies the particular event (528) as a string using dot notation. For example, if a graphical user agent transmits a voice utterance specifying a voice command 'browser go back,' then the graphical user agent may receive an event message having a value of 'command.back' in the 'Event' field. Readers will note that the exemplary event message above is for explanation only and not for limitation.

The method of FIG. 5 also includes controlling (530), by the graphical user agent (102), the distributed multimodal browser (196) in dependence upon the particular event (528). The graphical user agent (102) may control (530) the distributed multimodal browser (196) in dependence upon the particular event (528) by executing a set of actions based on the event identifier received for a particular event (528) in the event message (526). The set of action executed by the graphical user agent (102) to control the distributed multimodal browser may be contained in a function that receives an event identifier as a parameter such as the following exemplary function:

void processEvent(string EventID);

The exemplary 'processEvent' function above processes the event specified by the value of the 'EventID' parameter. Using the exemplary 'processEvent' function above, the graphical user agent (102) may control the distributed multimodal browser (196) according to computer program instructions specified in the definition of the exemplary 'processEvent' function. Depending on the event specified by the 'EventID' parameter, the graphical user agent may, for example, open a new window for browsing content, open a new tab for browsing content, or jump to content specified by a hyperlink in the document, and so on. In such a manner, the graphical user agent (102) may control (530) the distributed multimodal browser (196) according to the method of FIG. 5 by administering (531) a graphical user interface for the distributed multimodal browser (196) in dependence upon the particular event (528) or by navigating (532) content of the multimodal application (195) in dependence upon the particular event (528).

Figure 6:
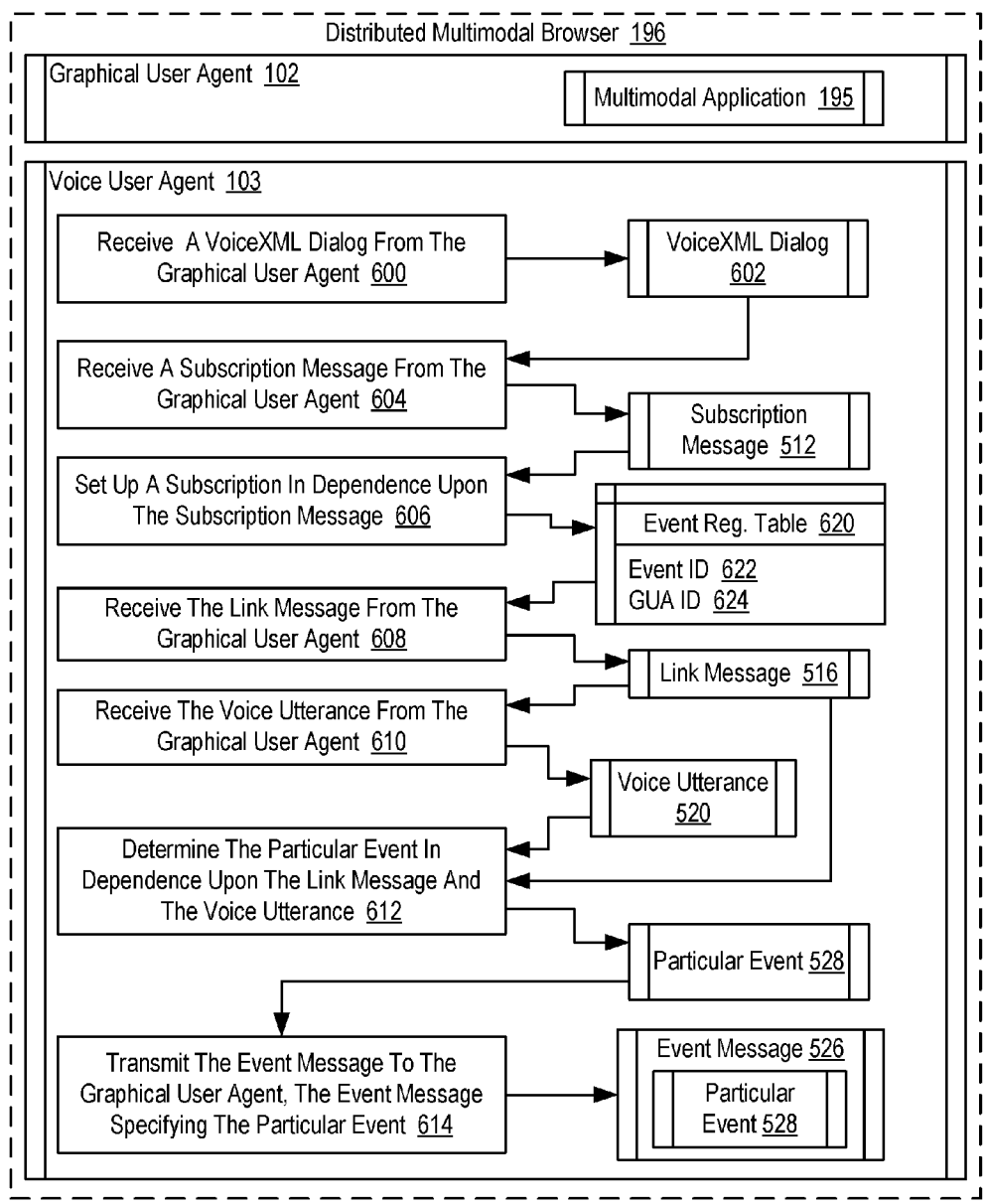
FIG. 6 sets forth a flow chart illustrating a further exemplary method of speech-enabled content navigation and control of a distributed multimodal browser according to embodiments of the present invention.

For further explanation, FIG. 6 sets forth a flow chart illustrating a further exemplary method of speech-enabled content navigation and control of a distributed multimodal browser according to embodiments of the present invention. Speech-enabled content navigation and control of a distributed multimodal browser in this example is implemented with a multimodal application (195), composed of at least one X+V page (124). The multimodal application (195) operates on a multimodal device supporting multiple modes of interaction including a voice mode and one or more non-voice modes of user interaction with the multimodal application. The voice mode may be implemented in this example with audio output through a speaker and audio input through a microphone. Non-voice modes may be implemented by user input devices such as, for example, a keyboard and a mouse.

In the example of FIG. 6, the distributed multimodal browser (196) provides an execution environment for a multimodal application (195). The distributed multimodal browser (196) of FIG. 6 includes a graphical user agent (102) that provides functionality for interaction between a user and the multimodal application (195) through a visual mode of user interaction. The distributed multimodal browser (196) of FIG. 6 also includes a voice user agent (103) that provides functionality for interaction between a user, the multimodal application (195), and the graphical user agent (102) through a voice mode of user interaction. In the example of FIG. 6, the graphical user agent (102) operates on the multimodal device (152), and the voice user agent (103) operates on a voice server (151). Although the user agents operate on separate computers, the graphical user agent (102) is operatively coupled to the voice user agent (103). The operative coupling may be implemented with an application programming interface ('API'), a voice service module, and a VoIP connection as described above.

The method of FIG. 6 includes receiving (600), by the voice user agent (103), a VoiceXML dialog (602) from the graphical user agent (102). The VoiceXML dialog (602) represents a VoiceXML dialog specified by the multimodal application (195) or a default VoiceXML dialog provided by the graphical user agent (102). The voice user agent (103) may receive (600) a VoiceXML dialog (602) from the graphical user agent (102) according to the method of FIG. 6 by extracting the VoiceXML dialog (602) from a message received from the graphical user agent (102) and processing the VoiceXML dialog (602) using a Form Interpretation Algorithm ('FIA') as discussed above. Because receiving a VoiceXML dialog causes the voice user agent (103) to activate a FIA and the FIA processes VoiceXML elements, readers will note that receiving a VoiceXML dialog from the graphical user agent (102) prepares the voice user agent (103) to process the VoiceXML link element included in the link message described below.

The method of FIG. 6 also includes receiving (604), by the voice user agent (103), a subscription message (512) from the graphical user agent (102). The subscription message (512) represents a request by a graphical user agent to receive certain events from a voice user agent. The voice user agent (103) may receive (604) the subscription message (512) from the graphical user agent (102) according to the method of FIG. 6 through the operative coupling between the graphical user agent (102) and the voice user agent (103). An example of the subscription message may include the 'add string event listener' message described above with reference to FIG. 5.

The method of FIG. 6 includes setting up (606), by the voice user agent (103), a subscription in dependence upon the subscription message (512). The voice user agent (103) may set up (606) a subscription according to the method of FIG. 6 by extracting the event identifiers for events of interest to the graphical user interface and associating the event identifiers (622) with an identifier (624) for the graphical user agent (102) in an event registration table (620).

The method of FIG. 6 also includes receiving (608), by the voice user agent (103), the link message (516) from the graphical user agent (102). The link message (516) of FIG. 6 represents a message that links voice commands for controlling a distributed multimodal browser with events used to process the voice commands. The link message (516) of FIG. 6 specifies voice commands that control the distributed multimodal browser (196) and specifies an event corresponding to each voice command. For example, the link message (516) may link the voice command 'browser new window' with the event identified by the identifier 'command.new.window.' The voice user agent (103) may receive (608) the link message (516) from the graphical user agent (102) according to the method of FIG. 6 through the operative coupling between the graphical user agent (102) and the voice user agent (103).

In the example of FIG. 6, the link message (516) includes a VoiceXML link element. The VoiceXML link element may specify the relationship between voice commands and events. For example, consider the following exemplary VoiceXML link element:

```
<vxml:link id="c3nlink"
eventexpr="application.lastresult$.interpretation.c3n">
    <vxml:grammar>
        <![CDATA[
        #JSGF V1.0;
        grammar c3nfinal;
        public <c3nfinal> = <c3n> {$.c3n = $c3n;};
        <c3n> = browser (<command>
        {$ = "command."+$command} | <link> {$ =
            "link."+$link});
        <command> = <history> {$ = $history} | <file> {$ = $file};
        <history> = [go] back {$ = "back"} | forward {$ = "forward"};
        <file> = "new page" {$ = "new.page"} |
        "new window" {$ = "new.window"};
        <link> = [ "go to" | "jump to" ]
        <documentlinks>{$ = $documentlinks};
        <documentlinks> = Glossary {$ = "glossary.html"}
            | Contents {$ = "contents.html"}
            | Next Page {$ = "chapter3.html"}
            | Previous Page {$ = "chapter1.html"};]]>
    </vxml:grammar>
</vxml:link>
```

The exemplary VoiceXML link element above includes an exemplary grammar that specifies various voice commands for controlling a distributed multimodal browser. Using the exemplary grammar above, a speech engine may recognize the following voice commands:

browser go back
browser forward
browser new page
browser new window
browser go to Glossary
browser jump to Contents
browser jump to Next Page
browser go to Previous Page Using semantic interpretation scripts in the grammar, the exemplary VoiceXML link element above associates an event with each voice command. As the voice user agent (103) processes the grammar, the voice user agent (103) builds an event identifier for a particular event that matches voice command spoken by a user. The event identifiers associated with each event in the exemplary VoiceXML link element above are as follows:

| VOICE COMMAND | EVENT IDENTIFIER |
| --- | --- |
| browser go back | command.back |
| browser forward | command.forward |
| browser new page | command.new.page |
| browser new window | command.new.window |
| browser go to Glossary | link.glossary.html |
| browser jump to Contents | link.contents.html |
| browser jump to Next Page | link.chapter3.html |
| browser go to Previous Page | link.chapter1.html |

As part of receiving (608) the link message (516) according to the method of FIG. 6, the voice user agent (103) may obtain the VoiceXML link element by extracting the VoiceXML link element from the link message (516) and may process the VoiceXML link element according to an FIA of the voice user agent (103).

The method of FIG. 6 includes receiving (610), by the voice user agent (103), the voice utterance (520) from the graphical user agent (102). The voice utterance (520) of FIG. 6 represents digitized human speech provided to the graphical user agent (102) by a user of a multimodal device. In the example of FIG. 6, the voice utterance (520) specifies a particular voice command for controlling the distributed multimodal browser such as, for example, 'browser go back,' 'browser go forward,' 'browser jump to Next Page,' and so on.

The voice user agent (103) may receive (610) the voice utterance (520) from the graphical user agent (102) according to the method of FIG. 6 through the operative coupling between the graphical user agent (102) and the voice user agent (103).

The method of FIG. 6 also includes determining (612), by the voice user agent (103), the particular event (528) in dependence upon the link message (516) and the voice utterance (520). The voice user agent (103) may determine (612) the particular event (528) in dependence upon the link message (516) and the voice utterance (520) according to the method of FIG. 6 by processing the voice utterance (520) along with the VoiceXML link element included in the link message (516) such as, for example, the exemplary VoiceXML link element illustrated above. The voice user agent (103) may process the voice utterance (520) along with the VoiceXML link element included in the link message (516) by providing the voice utterance (520) and a grammar in the VoiceXML link element to a speech engine for speech recognition and extracting an identifier for the particular event (528) from the results of the speech engine stored in an ECMAScript data structure.

An ECMAScript data structure useful for storing the results of the speech engine may include, for example, the application variable array 'application.lastresult$.' ECMAScript data structures represent objects in the Document Object Model ('DOM') at the scripting level in an X+V page of a multimodal application. The 'application.lastresult$' array holds information about the last recognition generated by a speech engine for the voice user agent (103). The 'application.lastresult$' is an array of elements where each element, application.lastresult$[i], represents a possible result through the following shadow variables:

application.lastresult$[i].confidence, which specifies the confidence level for this recognition result. A value of 0.0 indicates minimum confidence, and a value of 1.0 indicates maximum confidence.

application.lastresult$[i].utterance, which is the raw string of words that compose this recognition result. The exact tokenization and spelling is platform-specific (e.g. "five hundred thirty" or "5 hundred 30" or even "530").

application.lastresult$[i].inputmode, which specifies the mode in which the user provided the voice utterance. Typically, the value is voice for a voice utterance.

application.lastresult$[i].interpretation, which is an ECMAScript variable containing output from ECMAScript post-processing script typically used to reformat the value contained in the 'utterance' shadow variable.

Referring back to the exemplary VoiceXML link element above, readers will note that the semantic interpretations scripts build a string using dot notation that represents an identifier for a particular event. The resulting string is stored in a shadow variable labeled 'c3n' for the 'application.lastresult$.interpretation' variable. As such, the 'eventexpr' attribute of the exemplary VoiceXML link element directs the voice user agent (103) to retrieve the event identifier for the particular event (528) specified in the voice utterance (520) from the 'application.lastresult$.interpretation.c3n' variable.

The method of FIG. 6 includes transmitting (614), by the voice user agent (103), the event message (526) to the graphical user agent (102). The event message (526) of FIG. 6 specifies the particular event (528) corresponding to the particular voice command specified by the voice utterance (520). The voice user agent (103) may transmit (614) the event message (526) to the graphical user agent (102) according to the method of FIG. 6 by inserting the event identifier for the particular event (528) contained in the 'application.lastresult$.interpretation.c3n' variable in the event message (526) and transmitting the event message (526) to the graphical user agent (102) through the operative coupling between the graphical user agent (102) and the voice user agent (103). Readers will note that transmitting (614), by the voice user agent (103) to the graphical user agent (102), the event message (526) that specifies the particular event (528) corresponding to the particular voice command specified by the voice utterance (520) advantageously allows a distributed multimodal browser to provide speech-enabled content navigation and control of the distributed multimodal browser.

Exemplary embodiments of the present invention are described largely in the context of a fully functional computer system for speech-enabled content navigation and control of a distributed multimodal browser. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of speech-enabled content navigation and control of a distributed multimodal browser, the distributed multimodal browser providing an execution environment for a multimodal application, the distributed multimodal browser including a graphical user agent and a voice user agent operatively coupled to the graphical user agent, the graphical user agent operating on a multimodal device supporting multiple modes of user interaction including a voice mode and one or more non-voice modes, the voice user agent operating on a voice server, the method comprising:

transmitting, by the graphical user agent, a link message to the voice user agent, the link message containing voice commands that control the distributed multimodal browser including at least one grammar associated with the voice commands, the link message also containing an event corresponding to each voice command, wherein at least one of the voice commands is received by the graphical user agent from a voice markup corresponding to the multimodal application;

receiving, by the graphical user agent, a voice utterance from a user, the voice utterance specifying a particular voice command;

transmitting, by the graphical user agent, the voice utterance to the voice user agent for speech recognition by the voice user agent;

receiving, by the graphical user agent, an event message from the voice user agent, the event message specifying a particular event corresponding to the particular voice command specified by the voice utterance; and controlling, by the graphical user agent, the distributed multimodal browser in dependence upon the particular event.

2. The method of claim 1 wherein controlling, by the graphical user agent, the distributed multimodal browser in dependence upon the particular event further comprises navigating content of the multimodal application in dependence upon the particular event.

3. The method of claim 1 further comprising:
determining, by the graphical user agent, whether the multimodal application specifies a VoiceXML dialog; and
transmitting, by the graphical user agent, a default VoiceXML dialog to the voice user agent if the multimodal application does not specify the VoiceXML dialog.

4. The method of claim 1 further comprising subscribing, by the graphical user agent, to events from the voice user agent using a subscription message.

5. The method of claim 1 further comprising:
receiving, by the voice user agent, the link message from the graphical user agent;
receiving, by the voice user agent, the voice utterance from the graphical user agent;
determining, by the voice user agent, the particular event in dependence upon the link message and the voice utterance; and
transmitting, by the voice user agent, the event message to the graphical user agent, the event message specifying the particular event.

6. The method of claim 1 wherein the link message further comprises a VoiceXML link element.

7. The method of claim 1 wherein the event message specifies the particular event as a string using dot notation.

8. A system for speech-enabled content navigation and control of a distributed multimodal browser, the distributed multimodal browser providing an execution environment for a multimodal application, the distributed multi modal browser including a graphical user agent and a voice user agent operatively coupled to the graphical user agent, the graphical user agent operating on a multimodal device supporting multiple modes of user interaction including a voice mode and one or more non-voice modes, the voice user agent operating on a voice server, the system comprising one or more computer processors and computer memory operatively coupled to the computer processors, the computer memory having disposed within it computer program instructions configured to perform:

transmitting, by the graphical user agent, a link message to the voice user agent, the link message containing voice commands that control the distributed multimodal browser including at least one grammar associated with the voice commands, the link message also containing an event corresponding to each voice command, wherein at least one of the voice commands is received by the graphical user agent from a voice markup corresponding to the multimodal application;

receiving, by the graphical user agent, a voice utterance from a user, the voice utterance specifying a particular voice command;

transmitting, by the graphical user agent, the voice utterance to the voice user agent for speech recognition by the voice user agent;

receiving, by the graphical user agent, an event message from the voice user agent, the event message specifying a particular event corresponding to the particular voice command specified by the voice utterance; and controlling, by the graphical user agent, the distributed multimodal browser in dependence upon the particular event.

9. The system of claim 8 wherein controlling, by the graphical user agent, the distributed multimodal browser in dependence upon the particular event further comprises navigating content of the multimodal application in dependence upon the particular event.

10. The system of claim 8 wherein the computer memory also has disposed within it computer program instructions configured to perform:

determining, by the graphical user agent, whether the multimodal application specifies a VoiceXML dialog; and transmitting, by the graphical user agent, a default VoiceXML dialog to the voice user agent if the multimodal application does not specify the VoiceXML dialog.

11. The system of claim 8 wherein the computer memory also has disposed within it computer program instructions configured to perform subscribing, by the graphical user agent, to events from the voice user agent using a subscription message.

12. The system of claim 8 wherein the computer memory also has disposed within it computer program instructions configured to perform:

receiving, by the voice user agent, the link message from the graphical user agent;

receiving, by the voice user agent, the voice utterance from the graphical user agent;

determining, by the voice user agent, the particular event in dependence upon the link message and the voice utterance; and transmitting, by the voice user agent, the event message to the graphical user agent, the event message specifying the particular event.

13. The system of claim 8 wherein the link message further comprises a VoiceXML link element.

14. The system of claim 8 wherein the event message specifies the particular event as a string using dot notation.

15. A computer program product for speech-enabled content navigation and control of a distributed multimodal browser, the distributed multimodal browser providing an execution environment for a multimodal application, the distributed multimodal browser including a graphical user agent and a voice user agent operatively coupled to the graphical user agent, the graphical user agent operating on a multimodal device supporting multiple modes of user interaction including a voice mode and one or more non-voice modes, the voice user agent operating on a voice server, the computer program product disposed upon at least one non-transitory computer-readable recordable medium, the computer program product comprising computer program instructions configured to perform a method comprising:

transmitting, by the graphical user agent, a link message to the voice user agent, the link message containing voice commands that control the distributed multimodal browser including at least one grammar associated with the voice commands, the link message also containing an event corresponding to each voice command, wherein at least one of the voice commands is received by the graphical user agent from a voice markup corresponding to the multimodal application;

receiving, by the graphical user agent, a voice utterance from a user, the voice utterance specifying a particular voice command;

transmitting, by the graphical user agent, the voice utterance to the voice user agent for speech recognition by the voice user agent;

receiving, by the graphical user agent, an event message from the voice user agent, the event message specifying a particular event corresponding to the particular voice command specified by the voice utterance; and controlling, by the graphical user agent, the distributed multimodal browser in dependence upon the particular event.

16. The computer program product of claim 15 wherein controlling, by the graphical user agent, the distributed multimodal browser in dependence upon the particular event further comprises navigating content of the multimodal application in dependence upon the particular event.

17. The computer program product of claim 15 wherein the computer program product further comprises computer program instructions configured to perform:

determining, by the graphical user agent, whether the multimodal application specifies a VoiceXML dialog; and transmitting, by the graphical user agent, a default VoiceXML dialog to the voice user agent if the multimodal application does not specify the VoiceXML dialog.

18. The computer program product of claim 15 wherein the computer program product further comprises computer program instructions configured to perform subscribing, by the graphical user agent, to events from the voice user agent using a subscription message.

19. The computer program product of claim 15 wherein the computer program product further comprises computer program instructions configured to perform:

receiving, by the voice user agent, the link message from the graphical user agent;

receiving, by the voice user agent, the voice utterance from the graphical user agent;

determining, by the voice user agent, the particular event in dependence upon the link message and the voice utterance; and transmitting, by the voice user agent, the event message to the graphical user agent, the event message specifying the particular event.

20. The computer program product of claim 15 wherein the link message further comprises a VoiceXML link element.

* * * * *